(12) United States Patent
Aird et al.

(10) Patent No.: US 7,582,323 B2
(45) Date of Patent: Sep. 1, 2009

(54) DAIRY PRODUCT THAT DOES NOT CONTAIN EMULSIFICATION SALTS AND PROCESS FOR MAKING SAME

(75) Inventors: Ron M. Aird, Palmerston North (NZ); Richard H. Archer, Palmerston North (NZ); Paul Deuritz, Hawera (NZ); Frank P. Dunlop, Palmerston North (NZ); Marcellus Gesterkamp, Hawera (NZ)

(73) Assignee: Fonterra Tech Limited

( * ) Notice: Subject to any disclaimer, the term of this patent is extended or adjusted under 35 U.S.C. 154(b) by 649 days.

(21) Appl. No.: 10/474,289

(22) PCT Filed: Apr. 8, 2002

(86) PCT No.: PCT/NZ02/00056

§ 371 (c)(1),
(2), (4) Date: Jul. 26, 2004

(87) PCT Pub. No.: WO02/080691

PCT Pub. Date: Oct. 17, 2002

(65) Prior Publication Data

US 2004/0224069 A1 Nov. 11, 2004

(30) Foreign Application Priority Data

Apr. 6, 2001 (NZ) .................................. 511003

(51) Int. Cl.
*A23C 19/00* (2006.01)

(52) U.S. Cl. .................... 426/582; 426/580; 426/657

(58) Field of Classification Search .................. 426/520, 426/573, 580, 582, 657
See application file for complete search history.

(56) References Cited

U.S. PATENT DOCUMENTS

| | | | |
|---|---|---|---|
| 4,205,090 A | 5/1980 | Maubois et al. |
| 4,497,834 A | 2/1985 | Barta |
| 4,609,554 A | 9/1986 | Barua et al. |
| 4,689,234 A | 8/1987 | Ernstrom et al. |
| 5,213,827 A | 5/1993 | Nauth et al. |
| 5,356,640 A | 10/1994 | Jameson et al. |
| 5,358,730 A | 10/1994 | Dame-Cahagne et al. |
| 5,378,478 A | 1/1995 | Miller et al. |
| 5,445,845 A | 8/1995 | Farkye et al. |
| 5,567,464 A | 10/1996 | Barz et al. |
| 5,573,806 A | 11/1996 | Farkye et al. |
| 5,714,182 A | 2/1998 | Bisson et al. |
| 5,750,177 A | 5/1998 | Yee et al. |
| 5,895,685 A | 4/1999 | Bodor et al. |
| 5,902,625 A | 5/1999 | Barz et al. |
| 5,972,321 A | 10/1999 | Kligerman et al. |
| 6,177,118 B1 | 1/2001 | Blazey et al. |
| 6,183,804 B1 | 2/2001 | Moran et al. |
| 6,183,805 B1 | 2/2001 | Moran et al. |

FOREIGN PATENT DOCUMENTS

| | | |
|---|---|---|
| FR | 2714 795 | 1/1994 |
| JP | 01-148148 | 6/1989 |
| JP | 03-143358 | 6/1991 |
| WO | WO9518539 A1 | 7/1995 |
| WO | WO 0027214 | 5/2000 |

*Primary Examiner*—Leslie Wong
(74) *Attorney, Agent, or Firm*—Knobbe Martens Olson & Bear LLP

(57) ABSTRACT

The present invention is directed to a process for making fat-containing dairy based food products such as cheese, without the use of emulsification salts and products made by the process.

35 Claims, 3 Drawing Sheets

Stream 1

First milk protein based composition → Dehydration step → Combining step

Stream 2

Second milk protein based composition → Dehydration step (Optional) → Combining step

Modifications (as in figure 1)

Combining step ← Flavours ; and / or
Texturisers ; and / or
Nutritional supplements ; and / or
Fat ; and / or
Acid ; and / or
Condiments ; and / or
Non - dairy protein source

FIGURE 3

Combining step → Heating step ← Optional agitating step

↓ Optional Forming step

↓ Cooling step

↓ Optional moulding and / or packing steps

US 7,582,323 B2

DAIRY PRODUCT THAT DOES NOT CONTAIN EMULSIFICATION SALTS AND PROCESS FOR MAKING SAME

REFERENCE TO RELATED APPLICATIONS

The present application is the U.S. National Phase of PCT/NZ02/00056, filed Apr. 8, 2002, and claims priority to New Zealand Patent Application No. 511003, filed Apr. 6, 2001.

FIELD OF THE INVENTION

This invention relates to dairy based food product, to a process for making a dairy based food product, and to a product made by the process.

BACKGROUND

Many traditional dairy food products such as cheeses, yoghurts and the like use enzymes and/or microorganisms in order to produce appropriately flavoured and textured end products. Generally, cheeses and related products made by traditional processes require a maturation or ripening time in order to allow such enzymes and/or microorganisms to fully develop the required flavour and texture. Due to the variety of different manufacturing processes currently used there is a general inconsistency in the market place regarding the flavour and texture of dairy products, and cheeses in particular, which are being sold under the same product name, for example, cheddar cheese, edam cheese, and the like.

In addition, as these traditionally made dairy products may contain residual enzymes or active microorganisms they have a limited shelf life and can spoil easily especially if stored under conditions such as elevated temperatures.

This problem is overcome in processed cheese manufacture, a process which generally involves grinding and cooking the traditional cheese with an emulsifying salt to form a homogeneous molten mass which congeals on cooling into a finished cheese-like product of low enzyme and microorganism activity and therefore consistent, uniform texture, stable flavour, and improved shelf life over time compared with traditionally made cheeses. As processed cheese involves further processing of traditional cheese, processed cheese is more expensive to produce. Processed cheeses also tend to be produced with a limited range of textures which are not comparable to the type and range of textures available for traditionally made cheeses. In addition, processed cheese products created are bland in flavour, and contain emulsifying salts. As a result of the addition of emulsifying salts these products can no longer be described as "natural" cheeses.

A process is described in U.S. Pat. No. 6,183,805 for preparing a processed cheese product which does not use a traditionally made cheese and aims to produce processed cheese from milk in a short period of time. Such a simplified process involves the direct conversion of milk without fermentation, enzymatic treatment and/or intermediate steps of forming and separating curds and whey. In this process, pasteurised milk is acidified and subjected to UF to form a UF retentate. The UF retentate is evaporated to form a pre-cheese. The pre-cheese is then cooked with emulsifying salts to form a processed cheese product which is ready for immediately packaging and which has similar organoleptic properties to processed cheeses made by cooking traditional cheeses.

A process is described in U.S. Pat. No. 4,497,834 for preparing a processed cheese product by direct conversion of milk as above whereby milk is first condensed to the approximate proportions of total solids and moisture corresponding to that desired in the final product, lactose concentration in the milk is reduced and flavours and other additives incorporated into the condensed milk before the mixture is gelled by heating. The gelled composition may then be packaged and cooled. The use of emulsifying salts is taught for fat containing cheeses to provide uniform distribution of the fat and to ensure against fat separation. However, a product made by the process of this patent, as disclosed in U.S. Pat. No. 6,183,805, resulted in a doughy product with essentially no cheese or cheese-like structure, essentially no cheese flavour and which, upon melting exhibited unstable emulsions with severe oil-off and a mealy grainy texture. Such products were found to be not acceptable by the inventors of U.S. Pat. No. 6,183,805.

U.S. Pat. No. 6,183,804 describes a further method of producing processed cheese by the direct conversion of milk by first providing a powdered milk protein concentrate, reconstituting the powder, subjecting to fat and pH adjustment and cooking with emulsifying salts to produce a processed cheese product. This process is rapid and efficient, less labour intensive and less costly than traditional cheese making methods. However, as discussed above, the use of emulsifying salts limits the type of cheese able to be made by such a process and would preclude such cheeses from generally being considered as "natural" cheeses.

It would be desirable to provide a rapid manufacturing process for making a fat-containing stable dairy based food product, and in particular a "natural" cheese product, which does not include the use of emulsifying salts or non dairy derived emulsifying agents, and which provides a consistent storage stable product for immediate distribution to the market place.

U.S. Pat. No. 6,177,118 describes a rapid process for making both "natural" and processed cheeses by direct conversion of milk without fermentation or coagulation. This process involves a combination of milk retentate with a dry protein concentrate or isolate. This mixture is heated to 80° C. for two minutes to form a homogenous molten plastic mass which may be packaged immediately and cooled to solidify the cheese product. No emulsifying salts are used in this process and fat is held in solution by simple blending shortly before the high heat melt. The production of the high heat melt makes this process similar to a process for making processed cheese so that only "natural" cheese products having a limited range of textures are likely to be produced by such a process. This "natural" cheese can be used as a base to make a processed cheese by melting, combining with emulsifying salts and heating to 80° C. for two minutes to produce a further homogenous plastic mass, which may be packaged directly and cooled to form a solid processed cheese mass. In addition, U.S. Pat. No. 6,177,118 teaches the addition of starter culture in the process of "natural" cheese production, however, under conditions which do not allow fermentation per se to take place. Such a process further necessitates the use of a subsequent heat treatment step to stop microbial growth to achieve a cheese product having an improved stability and longer shelf life than conventionally made cheese products.

U.S. Pat. No. 5,213,827 discloses a process of producing a precheese or a "natural" cheese. This is implemented by first producing a skim milk retentate, fermenting the retentate and centrifuging to produce a concentration to which additives such as fat, salt, protein, etc may be added before re-fermenting to produce a cheese base. The cheese base may be further processed by fermentation to produce a precheese suitable for use in the manufacture of processed cheese. This precheese may be texturised to produce a "natural" cheese. However, such a "natural" cheese may still be unstable in storage due to the presence of fermenting bacteria.

U.S. Pat. No. 4,205,090 discloses a method of making a "natural" cheese again by first producing a skim milk retentate by ultrafiltration to incorporate whey protein into cheese. Such a UF retentate may then be converted immediately to cheese using the traditional method of addition of starter culture and/or rennet to initiate coagulation. The presence of residual microorganisms and/or enzymes makes the resulting "natural" cheese unstable in storage.

Other workers have used direct acidification processes to manufacture cheeses without the need to use microorganisms. For example, GDL may be used in combination with or in the place of starter cultures. GDL addition to milk or UF retentates reduces pH and results in curd formation which may be directly packaged and marketed. However such processes are generally only used in the production of soft cheeses such as cottage cheese and feta. An overview of the use of GDL is given in European Dairy Magazine No 2 (1989), p61-66.

It would be desirable to provide a rapid process of making a broad range fat-containing stable dairy based food products, and particularly a "natural" cheese product, which does not include the addition of starter culture so that endogenous microbial growth in the final product is not a concern, wherein the final product has a consistent flavour and texture from the time of manufacture, an improved stability and longer shelf life than conventionally made dairy products.

It is an object of the present invention to provide such processes and/or at least to provide the public with a useful choice.

SUMMARY OF THE INVENTION

The present invention provides a process for producing a fat-containing dairy based food product whereby a first milk protein based composition is dehydrated to increase total solids and combined with at least one additive preferably selected from the group comprising but not limited to a flavour enhancer, a texture enhancer, a nutritional supplement, a fat source, a carbohydrate source, condiments, a second milk protein based composition, a non-dairy protein source or any other dairy derived product or GRAS ingredient, to create a stable emulsion without the use of an emulsifying salt or non dairy derived emulsifying agents. This emulsion is heated to at least 50° C. for up to 60 minutes to initiate coagulation to form a gel and preferably cooled to less than 20° C. to complete gel formation to give a final product. The conditions of coagulation and gel formation of the present invention are not as severe as the prior art processes which produce an untexturised melt. In general, at least the first milk protein based composition is modified to give the required nutritional composition, texture, functional and/or flavour characteristics of the final food product in particular, such modifications are selected to at least enhance hydrophobicity in order to ensure an acceptable level of fat emulsification. In addition, the modifications, including the temperature, time, shear and pressure conditions used in the present process are selected not only to cause sufficient coagulation, but also to produce a broad range of desired texture characteristics in the gelled end product rather than producing a limited texturised product as are generally produced by standard cheese making processes.

Such modifications include lactose adjustment, pH adjustment, mineral level adjustment (e.g. calcium depletion), salt adjustment, whey protein adjustment, enzyme addition (to improve flavour and/or texture), moisture adjustment. (i.e. fat/water addition), temperature treatments, ultrasonication, shearing processes or combinations thereof. Such modifications may be carried out in the staring composition, i.e. before dehydration, or after dehydration or at any other suitable step in the process so that the present process has increased flexibility over prior art processes.

Preferably, the process comprises the combination of a first and second milk protein based composition, wherein at least one of said compositions has been modified as described above.

The process may be a batch, semi-continuous or continuous process. Preferably the process is a semi-continuous process and most preferably, the process is a continuous process.

The term "milk protein based composition" as used herein refers to milks or milk products containing milk proteins. Included in this term are skim milk whole milk, reduced fat milk, fat enhanced milk, milk ultrafiltration retentates, milk concentrates, milk powders, and milk powders reconstituted to form a solution, as well as milk products derived from these.

The milks or milk products may be sourced from any milk producing animal or from an analogue milk.

Stable dairy based food products created by this technology may amongst others comprise: hard, soft or semi-soft cheese, cream cheese, yoghurt, mousse, dessert, dairy dips, dressing, or dairy additive for use as a food ingredient. Depending on the desired product, the composition, flavour and texture is controlled by modifying the ingredient materials and/or proportions used when implementing this process.

The present invention will now be described with reference to the accompanying drawings in which:

FIG. 3 shows: a flow diagram of a third process embodiment of the present invention.

DETAILED DESCRIPTION OF THE INVENTION

Figure 1:
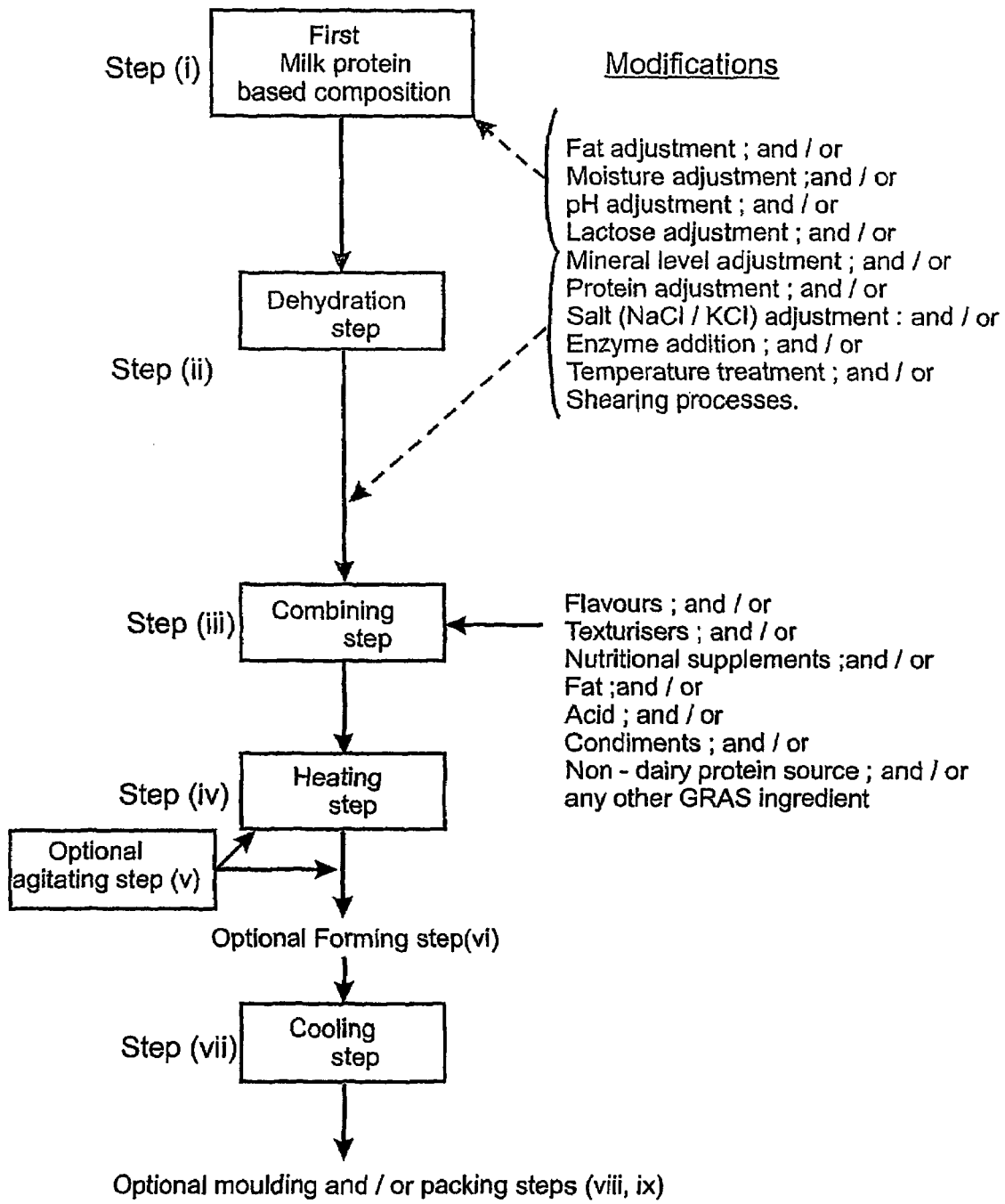
FIG. 1 shows: a flow diagram of a first process embodiment of the present invention.

The present invention is directed to a process for producing a fat-containing stable dairy based food, particularly a "natural" cheese product, having flavour and texture characteristics of a conventionally produced product but having the additional benefits of long shelf life, rapid manufacture and market release, and flexible functionality. In particular, the present process produces a fat-containing dairy product without the need for the addition of emulsifying salts or non dairy derived emulsifying agents, as well as providing, an improved consumer product performance by avoiding the use of live microorganisms or the requirement for the action of enzymes, thereby increasing the shelf life of the final product The process broadly comprises a combination of at least one dairy based protein composition feed stream with any one of a number of GRAS ingredients (but excluding the group known as emulsifiers), including a second dairy based protein composition feed stream, which under suitable processing conditions form a stable emulsion. The emulsion is heated either during its formation or subsequent thereto, where upon it coagulates to form the desired gelled dairy product. The protein feed stream(s) may be modified in a variety of ways at a variety of steps to modify the desired properties of the final food product, including texture, flavour, functionality and nutritional composition. The gel strength of the final food product is controlled depending on the type of end product desired. Typical end products include hard cheese, soft cheese, cheese paste, yoghurt, dairy dips, mousse, salad dressings etc. Thus the present invention provides a process capable of producing a broad range of products.

In particular, the present invention provides a process for making a fat-containing stable dairy based food product comprising the steps:

(i) providing a first milk protein based composition;
(ii) optionally dehydrating said first milk protein based composition to increase total solids to 15 to 98 wt % if required, preferably 15 to 60% for fluid compositions, 50 to 75% for paste-like compositions, or 90 to 99% for powder compositions;
(iii) combining the product from steps (i) or (ii) with at least one additive, other than an emulsifying salt or non dairy derived emulsifying agents, selected from the group comprising but not limited to a flavour enhancer, a texture enhancer, a nutritional supplement, a fat source, a carbohydrate source, condiments, a second milk protein based composition, a non-dairy protein source, or any other dairy derived product or GRAS ingredient and agitating to create a stable emulsion;
(iv) heating the emulsion of step (iii) to a temperature above 50° C. for up to 60 minutes, preferably for up to 10 minutes, to initiate coagulation and gel formation;
(v) optionally further additional agitating either concurrently with the preceding heating step (iv) or subsequent thereto, to assist in coagulation and to impart the desired texture modification;
(vi) optionally forming the mixture of step (iv) or (v) into a suitable shape; and
(vii) cooling the mixture of step (iv) or (v), or the formed mixture of step (vi), preferably to a temperature of less than 20° C., to complete gel formation and to produce a final food product; wherein the first and/or second milk protein based composition is modified at one or more steps of the process; wherein the first and/or second milk protein based composition is modified to alter one or more properties selected from flavour, texture, nutritional composition and functionality of the final food product; and wherein said first and/or second milk protein based composition comprises a milk or milk product selected from the group consisting of pasteurised or unpasteurised whole milk, skim milk, reduced fat milk, fat enhanced milk, milk ultrafiltration retentates, milk concentrates, powered whole, reduced fat or skim milk, reconstituted whole, reduced fat or skim milk powder or any combination therefor, wherein said milk or milk product is sourced from any milk producing animal or analogue milk; with the proviso that when the first milk protein based composition of step (i) or (ii) is a milk ultrafiltration retentate, the second milk protein based composition or non-dairy protein source added in step (iii) is not a protein concentrate or isolate when the process is used to make cheese.

The process of the present invention may further comprise the following optional steps:

(viii) moulding/forming the cooled or partially cooled food product into a suitable shape; and/or
(ix) packing the final food product into a suitable package.

The final food product may also be stored by refrigerating, chilling or freezing.

In a preferred embodiment, the agitating step (v) is included in the process and is carried out during the heating step (iv). More preferably, the combining, heating and agitating steps ((iii)-(v)) are carried out in a single apparatus whereby the formation of the emulsion, the coagulation and gelling occur concurrently or consecutively to impart product texture.

Figure 2:
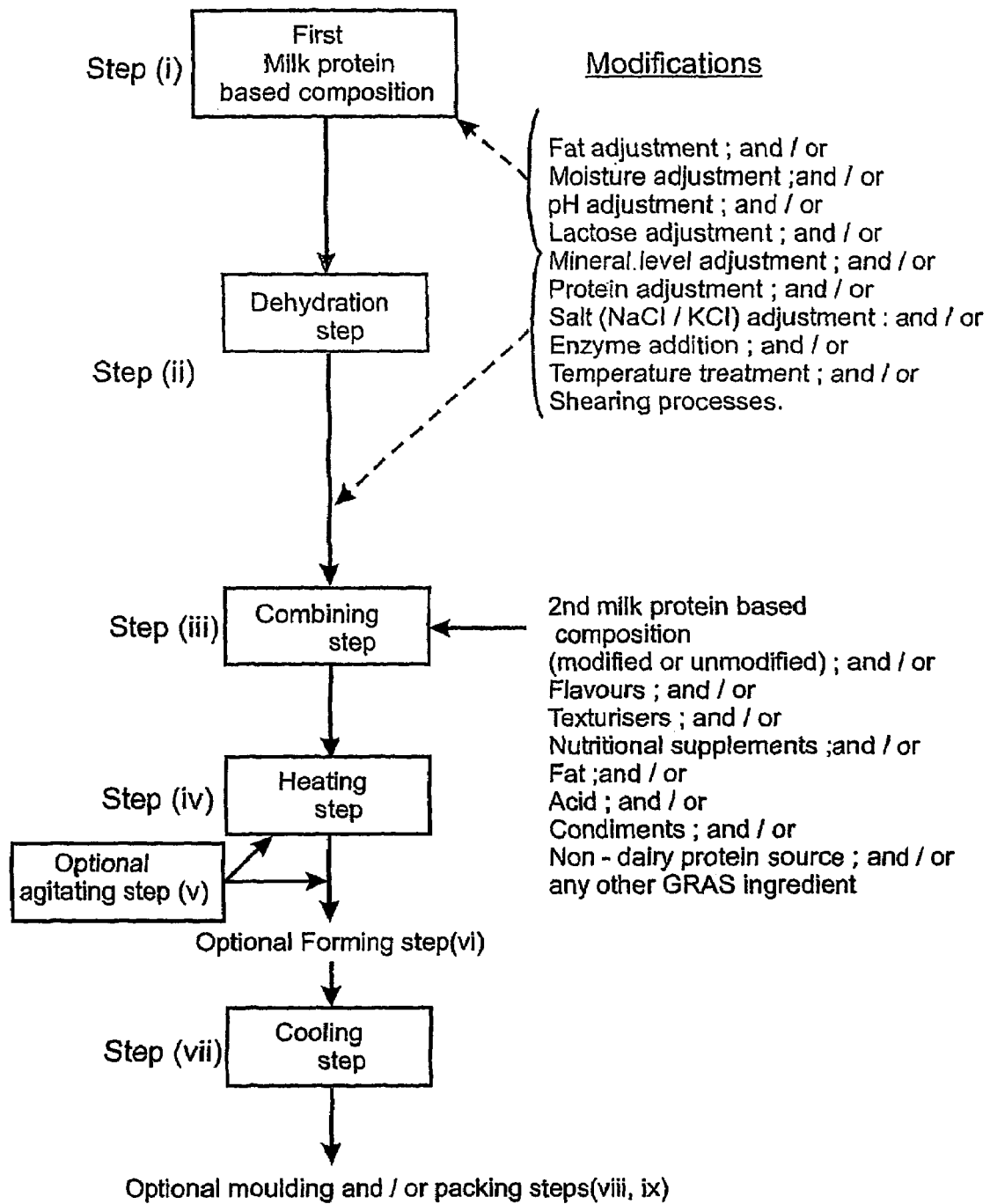
FIG. 2 shows: a flow diagram of a second process embodiment of the present invention.

These process steps are shown in schematic form in FIGS. 1, 2 and 3. FIG. 1 shows a process comprising a single milk protein based composition stream; FIG. 2 shows a process comprising an optional second milk protein stream and FIG. 3 shows a process comprising two milk protein streams.

For some embodiments based on FIGS. 1, 2 and 3, the dehydration step (ii) may not be essential. For example, it will be appreciated that where the starting material is a powdered milk, or the final product is of low total solids, dehydration may not be required.

Modifications

The various modifications are listed and the dotted lines in FIGS. 1-3 show the optional steps where such modifications may occur. The modifications are to facilitate the desired texture, flavour, nutritional composition or other properties, such as functional properties, of the final food product Such modifications may include one or more of the following:

pH Adjustment

This may be achieved by addition of an acidulant or alkali. Preferably the adjustment would be achieved by addition of a suitable food grade acid or lactone. The acid or lactone would be diluted with water to less than 5% w/w before addition and the addition would be concurrent with suitable agitation of the milk protein based composition to ensure adequate dispersion of the acidulant so as to avoid significant localized, uneven change in pH.

The pH adjustment may support a contribution to the desired flavour of the final food product and may cause a modification in the properties of the proteins in the milk protein based composition, thereby imparting a change to the contribution of these proteins to coagulation processes, and texturisation processes and therefore the texture of the final product Mineral Level Adjustment (e.g. Calcium Depletion)

Mineral level adjustment may be achieved by methods comprising addition of specific required minerals, or removal by suitable techniques. Some methods that may be used for removal include filtration processes such as ultrafiltration (UF), diafiltration (DF), loose reverse osmosis (LRO) (otherwise known as nanofiltration), acid UF, and acid DF, using suitable membrane molecular weight (MW) cut offs for any of the filtration techniques, ion exchange, a suitable pH, and other conditions known in the art In particular, UF and DF methods as described below under "step (ii)", may be used.

The adjustment of specific mineral levels such as calcium level may support a contribution to the desired flavour of the final food product and may cause a modification in the properties of the proteins in the milk protein based composition, thereby imparting a change to the contribution of these proteins to coagulation processes, and texturisation processes and therefore the texture of the final product, as well as contributing to the required nutritional composition of the final food products.

Protein Adjustment (e.g. to Increase or Decrease Amount)

The protein content of the first milk protein based composition of step (i) may be reduced by the addition of a milk permeate. Alternatively, the protein content may be increased by adding a source of milk-protein such as WPC, WPI, MPC, MPI, TMP, whey protein fractions, or any non-milk protein such as soya protein. Optionally, this addition would be of an ultrafiltration retentate of increased protein to solids ratio as compared to milk, or by addition of powdered form of the protein with sufficient time for hydration. Alternatively or additionally, proteins may be added at any other suitable step in the process to give a desired protein content, nutritional value, or function in the final food product.

Fat Adjustment (e.g. to Increase or Decrease Amount)

The fat content of the first milk protein based composition of step (i) may be adjusted by separation of the milk protein based composition, and standardisation of the fat content by the addition of a cream. Alternatively, the fat content may be increased by adding a suitable source of fat such as cream, double cream, butter, anhydrous milk fat (AMF), liquefied fresh frozen milk fat for recombining (FFMR), or a non-dairy fat such as vegetable oil. Alternatively or additionally, fat may be added at any other suitable step in the process to give a desired fat content in the final food product. Preferably, fresh double cream is added before dehydration has been implemented by evaporation and/or drying, and/or at the combining step.

Salt Adjustment (e.g. Addition of NaCl, KCl)

Salt adjustment may be achieved by methods comprising addition of specific required salt compounds such as NaCl and KCl at one or more steps of the process.

The salt adjustment may support a contribution to the desired flavour of the final food product and may cause a modification in the properties of the proteins in the milk protein based composition, thereby imparting a change to the contribution of these proteins to coagulation processes, and texturisation processes and therefore the texture of the final product, as well as contributing to the required nutritional composition of the final food products Lactose Adjustment (e.g. Removal to Achieve <10 wt % Preferably <6 wt % of final product)

Lactose adjustment may be achieved by methods comprising addition of a milk permeate, by addition of a dry lactose powder or lactose containing powder, or removal methods. Some of the methods that may be used for removal include filtration processes such as UF, DF, reverse osmosis (RO), LRO and microfiltration (MF). In particular, UF and DF methods as described below under "step (ii)", may be used. The primary purpose of lactose adjustment may be to facilitate the desired texture, flavour and nutritional composition in the final food product.

Enzyme Addition (e.g. for Texture or Flavour Development)

Enzymes such as Rennet are traditionally used in cheese making processes to assist in the traditional coagulation process step. In the present process, Rennet, or any other suitable enzymes known in the art may be added at any one of several steps of the proposed process. The purpose of the addition is to support a contribution to the desired flavour of the final food product and may cause a modification in the properties of the proteins in the milk protein based composition, thereby imparting a change to the contribution of these proteins to coagulation processes, and texturisation processes and therefore the texture of the final product.

Moisture Content Adjustment (e.g. Addition of Water/Fat/Protein)

Moisture content may be adjusted upwards by addition of water or may be adjusted downwards by addition of a lower moisture product than the milk protein based composition. Likely compositions that may be added are fat and protein streams.

The purpose of the adjustment of moisture content would be to contribute to the nutritional composition and texture of the final food product.

Temperature Treatments

Temperature treatments may be executed by exposure of the milk protein based composition to appropriate combinations of temperature and time. These treatments may alter the characteristics of the proteins, and impart different flavours. The purpose of the temperature treatments would support a contribution to the desired flavour of the final food product and may cause a modification in the properties of the proteins in the milk protein based composition, thereby imparting a change to the contribution of these proteins to coagulation processes, and texturisation processes and therefore the texture of the final product.

Shearing/Texturisation Processes

Shearing/texturisation processes may modify the state of protein and fat components in the milk protein based composition. Such a modification may be undertaken by a device such as a high shear mixer, high shear pump, homogenizer, extruder or any other suitable device known in the art Texturisation of the milk protein based composition may impart the desired texture and/or functionality of the final food product.

The modifications may be carried out by any other suitable technique known in the art.

Step (i)

The first milk protein based composition of FIGS. 1-3 may comprise a milk or milk product selected from pasteurised or unpasteurised whole milk, skim milk, reduced fat milk, fat enhanced milk, milk ultrafiltration retentates, milk concentrates, powdered whole, reduced fat or skim milk, reconstituted whole, reduced fat or slim milk powder or any combination thereof. Such milk may be sourced from any milk producing animal or any analogue milk source. The second milk protein based composition of FIGS. 2 and 3 may comprise one or more of the milk and milk products listed above for the first milk protein based composition.

The first and/or second milk protein based compositions are modified in at least one step of the process by pH adjustment, mineral level adjustment (e.g. calcium depletion), whey protein adjustment, lactose adjustment, adding NaCl/KCl, fat, water or enzymes, temperature treatments, or shearing processes as described above to give the required nutritional composition, texture, functionality and/or flavour characteristics of the final food product using standard techniques in the art. Where the second milk protein based composition comprises more than one milk or milk product source, either or both of the milk or milk product source may be separately modified.

The fat and protein content of the first and/or second milk protein compositions are adjusted to provide a fat content of between 0.05 and 7%, preferably between 0.05 and 5%, and a protein content of between 2 and 6%, preferably between 2.5 and 4% as described above under "modifications".

Preferably, the process comprises the use of two milk protein based compositions where one or both streams have been modified, for example as shown in FIGS. 2 and 3. The use of two milk protein based compositions allows greater flexibility to achieve desired properties of the final food product, including texture, flavour, functionality and nutritional composition.

Step (ii)

The first milk protein based composition may be dehydrated in step (ii) if required, by any suitable method known in the art such as, for example, by precipitation and separation, filtration, evaporation, and/or drying using conditions known in the art to form a composition in the form of a liquid, paste or solid.

Precipitation and separation may be carried out using an optional coagulating substance treatment, followed by acidification, heating and concentration of the total solids. In a preferred embodiment, pasteurised skim milk would be cooled to below a temperature which would permit rapid coagulation. A coagulating substance, which would normally be rennet, would be added. If this agent is rennet, it would be added at a rate of 0.001% to 0.01% v/v, and the skim milk then held for at least four hours. Precipitation is initiated by 'in line' injection of a suitable food grade acid or lactone to adjust the pH to within the range of 5.2 to 6.0. The introduced substance is thoroughly mixed with the milk flow using for example in line static mixers. The skim milk is then heated either by direct or indirect heating to between 40 and 55° C. and held for up to 5 minutes. The precipitated curd is captured on a screen and then washed in warm, acidified water. The curd/water mixture is then dewatered in a suitable device, preferably a decanter type device, and the curd is optionally reduced in size by some suitable milling device. The curd is optionally dried using an appropriate method such as 'fluidised bed' or 'ring' drying to a target moisture content of 4 to 8%. This process concentrates the total protein content and alters the moisture, lactose, mineral and whey protein content, and the pH of the milk protein based composition.

Filtration may be carried out by UF, DF, RO, LRO (otherwise known as nanofiltration), MF, acid UF and acid DF using suitable membrane MW cut offs for any of the filtration techniques, a suitable pH, and other conditions known in the art. For the case of UF and/or DF, the milk-protein based composition may be optionally pasteurised, and in the case of processing of whole milk would be standardised to a suitable fat level. The 'milk' temperature would be adjusted to the required membrane filtration feed temperature which may range from 0 to 60° C. but would be preferably in the ranges of 5 to 15° C. or 45 to 55° C. The milk would then be concentrated by continuous or batch ultrafiltration using a suitable plant design and membranes of suitable MW cut off selections known in the art, to yield a retentate stream with a milk protein level of 50 to 90% protein in solids non fat, preferably 70 to 85%. Diafiltration would be used as required to achieve the target protein in solids non fat ratio. This may be either through continuous addition of water to one or more stages of the UF plant in the case of batch or continuous process or by batch addition at one or more-times into the retentate in the case of a batch UF process. This diafiltration water would be at a suitable temperature for the process being employed. The UF and/or DF process may be conducted at a lowered milk pH in the range of 5.4 to 6.8 but preferably a pH in the range of 5.7 to 6.1, by the addition of a dilute acid to the milk or diafiltration water. The acid used would preferably be a food grade acid such as lactic or citric acid diluted to less than 5% w/w before addition, and the milk would preferably be at less than 10° C. and preferably less than 5° C. The resultant acidified retentate may be optionally pH adjusted with an appropriate alkali agent to a pH of 6 to 6.8%, preferably with dilute NaOH. A UF/DF process may obtain a yield of up to 60% total solids for wholemilk, and 40% total solids for skim milk, and preferably up to 45% for whole milk and 28% for skim milk.

The above process concentrates the total protein and fat content and alters the moisture, lactose, and mineral content, and optionally the pH of the milk protein based composition.

Evaporation may be carried out by techniques known in the art such as falling film, rising film, flash or agitated thin film evaporation to give up to 75% total solids, preferably up to 65% total solids. Optionally a 'fat' stream may be added prior to the use of any of these techniques to enhance concentrate flow properties and to contribute to a desired fat content in the final food product. Preferably, fresh cream of 35 to 80% fat, most preferably approximately 75% fat, is added, and preferably the fat content of the milk-protein based composition passing through evaporation does not exceed 55% fat in the dry matter. Preferably the product temperature within the evaporator should not exceed 65° C. at any time, more preferably 60° C.

Further dehydration may also be carried out by techniques known in the drying art such as roller, spray, ring or freeze drying to give up to 99% total solids (w/w). Optionally a 'fat' stream may be added prior to the use any of these techniques to contribute to a desired fat content in the final food product. Preferably, fresh cream of 35 to 80% fat, most preferably approximately 75% fat, is added, and preferably the fat content of the milk-protein based composition passing through dehydration does not exceed 55% fat in the dry matter. Preferably the product temperature should not exceed 70° C.

When both a first and second milk protein based composition is used in the present process, either or both compositions may be dehydrated if necessary as described above.

Step (iii)

Preferably combining step (iii) may be carried out in a device capable of sufficient agitation of sufficient mechanical shear so as to produce a homogeneous emulsion on mixing without having to add emulsifying salts. Examples of such suitable devices include an extruder, an auger device, an in-line static mixer, a Blentech™ twin screw lay down cooker, a Stephan™ type cooker, a Rototherm™ evaporator and any other suitable apparatus known in the art. Preferably the various streams would be added into the combining device such that any fat stream to be added is put in first and liquefied if required, followed by any water required to provide a desired composition and texture in the final product, followed by any high concentration milk-protein based compositions, followed by any other liquid or paste components such as flavours, followed by any powdered components, followed by any acid. It is important that powders are added slowly to ensure successful hydration. After all ingredients are added, it is preferable that mixing is continued for a period of 5 to 30 minutes, most preferably 10 to 20 minutes, to ensure proper hydration of all ingredients, and to ensure a homogeneous mixture, and to ensure sufficient emulsification of components.

The emulsion produced at step (iii) is stable in that fat remains emulsified prior to and during subsequent process steps. In particular, the emulsion is formed as a result of at least one of the milk protein based compositions used in the process having been modified to enhance its hydrophobicity.

A number of GRAS ingredients and other additives may be added at combining step (iii) including water, flavours, texturisers, nutritional supplements, acids, additional protein sources etc.

A flavour enhancer which may be added at combining step (iii) is preferably selected from one or more of the group consisting of NaCl, KCl, food grade acids (such as lactic acid, citric acid, acetic acid and the like), lactose, fat, and flavours including enzyme modified cheeses.

A texture enhancer which may be added at step (iii) is preferably selected from one or more of the group consisting of water, food grade acid, lactose, fats, gums, starches, carbohydrates, sources of monovalent and divalent cations such as $CaCl_2$, NaCl and KCl.

pH modification may be effected at step (iii) by addition of acidulants such as food grade acids and/or lactones. Preferably, this addition is after all other ingredients have been added.

A nutritional supplement which may be added at step (iii) is preferably selected from one or more of the group consisting of vitamins, minerals, carbohydrates, pre-biotics, and biologically active agents.

A condiment which may be added at step (iii) is preferably selected from one or more of the group comprising flavouring salts, spices, herbs, diced fruit and vegetables and the like.

The non-dairy protein which may be added at step (iii) may be selected from one or more of the group comprising soya protein, wheat protein or any other suitable non-milk derived protein source. When the process is used for cheese making, in a further embodiment of the invention, the non-dairy protein is not a protein concentrate or isolate when the first milk based protein composition is a UF retentate.

The second milk protein based composition which may be added at step (iii) may comprise one or more of the group comprising a milk or milk product selected from pasteurised or unpasteurised whole milk, skim milk, reduced fat milk, fat enhanced milk, milk ultrafiltration retentates, milk concentrates, powdered whole, reduced fat or skim milk, reconstituted whole, reduced fat or skim milk powder or any combination thereof. Such milk may be sourced from any milk producing animal or any analogue milk source.

Preferably, the second milk protein based composition is selected from the group comprising:
  (a) whole milk, reduced fat milk, skim milk or reconstituted whole milk, reduced fat milk or skim milk having 0.05 to 7 wt % fat, preferably 0.05 to 5 wt % fat and 2 to 6 wt % protein, preferably 2.5 to 4 wt % protein; and/or
  (b) a milk of group (a) which has been dehydrated to increase total solids to 15 to 98 wt %; and/or
  (c) a milk of group (a) and/or group (b) which has been modified to produce a desired property in the final food product.

When the process is used for cheese making, the second milk protein based composition is not a milk protein concentrate or isolate when the first milk protein based composition is UF retentate.

It will be appreciated that any number of other additives commonly used in food production may be added in this process such as colourants, flavours and the like.

Step (iv)

The heating step (iv) may be carried out in a suitable device by direct or indirect methods including steam injection, microwave energy, indirect steam or other heating fluids, indirect electrical heating, radio frequency, ohmic heating and the like to a suitable temperature above 50° C. In one embodiment heating is preferably carried out in the same device as the combining and emulsification step (iii). The heating step preferably takes place whilst the emulsion is being continuously mixed, preferably to a temperature range of between 50 to 120° C., more preferably 60 to 90° C. and most preferably 65 to 75° C., for a period of up to 60 minutes, preferably less than 10 minutes, more preferably less than 5 minutes, to initiate coagulation and gel formation. The timing will vary depending on the properties and composition of the ingredients used and on the properties of the particular final product being made. Where there has been an enzyme addition in any one of the previous steps, the heating step would result in considerable deactivation of the enzyme so that there would be greatly reduced residual activity in the final product, and preferably no residual activity. In addition, this step would also greatly reduce endogenous microorganism activity.

Coagulation is observed when the mixture begins to change from a paste-like appearance to a coherent gel. As discussed above, this step is carried out under conditions which give rise to the development of a broad range of desired textures in the resulting gelled product, whilst avoiding the production of molten mass of limited textures as is produced in standard processed cheese production.

Step (v)

Preferably the further agitation step (v) may be carried out in a device capable of sufficient mechanical shear so as to produce the desired texture in the final gelled product. Examples of such suitable devices include an extruder, an auger device, a Blentech™ twin screw lay down cooker, Damrow single screw lay down cooker, a Rototherm™ evaporator and any other suitable apparatus known in the art.

Preferably the further agitating step (v) takes place concurrently with heating step (iv), or subsequent thereto and preferably in the same device. Most preferably steps (iii)-(v) take place concurrently in the same device.

Step (vi)

The forming step (vi) is optional and may be carried out by any suitable method known in the art, for example, that the gelling mixture of step (iv) may be formed into a suitable shape mechanically by using ad extruder or any other apparatus know in the art, or manually for smaller batches. In addition, the forming step may be carried out before or after partial cooling of the gelling mixture.

Step (vii)

The cooling step (vii) may be carried out by any suitable technique known in the art. These techniques may include chilled water bath, scraped surface coolers, cold belt, cold table, cold rollers, cold moulds or cold tunnels. The formed gelling mixture is preferably cooled to a temperature of below 20° C., more preferably less than 15° C. to complete gel formation. One method of cooling is to contact the gelling mixture with a "cold table" surface as is widely used in the manufacture of a "processed" cheese.

Alternatively, the hot coagulated gelled mixture may be directly packaged and gel formation completed upon cooling either using a method described above, or by simply leaving to cool in storage.

Steps (viii) and (ix)

The moulding and packaging steps (viii) and (ix) respectively are optional and may be carried out by any suitable methods known in the art. However, in a preferred embodiment the gelled dairy product is cooled, formed/moulded and packaged into individual portions by suitable techniques known in the art to provide a product which is ready for immediate distribution to the market place.

In addition, further process steps may be applied to the present process to produce a desired final food product. For example, the emulsion of step (iii) may be aerated or whipped if it is desired to produce an aerated or whipped product such as a mousse.

The present invention further provides a stable dairy based food product comprising gelled protein wherein said product does not contain any emulsifying salts or non dairy derived emulsifying agents and further has greatly reduced active residual enzymes and/or microorganisms compared to similar products manufactured by traditional processes.

The dairy based food product may amongst others comprise a hard or semi-soft cheese, cream cheese, yoghurt, mousse, dessert, or dressing, depending on the final moisture, fat and flavour content. Desirably, the product is a formable, stable cheese product which has a composition similar to a traditionally made cheese as opposed to a processed cheese. In addition, the dairy based food product may be used as an additive to increase the nutritional value or functional properties of other foods.

The present invention further provides a dairy based food product by the process of the invention, which may amongst others comprise a hard or semi-soft cheese, cream cheese, yoghurt, mousse, dessert, or dressing, depending on the type and level of modifications-used in the process. In addition, the dairy based food product may be used as an additive to increase the nutritional value or functional properties of other foods.

Any ranges mentioned in this patent specification are intended to inherently include all of the possible values within the stated range.

This invention may also be said broadly to consist in the parts, elements and features referred to or indicated in the specification of the application, individually or collectively, and any or all combinations of any two or more of said parts, elements or features, and where specific integers are mentioned herein which have known equivalents in the art to which this invention relates, such known equivalents are deemed to be incorporated herein as if individually set forth.

The invention consists in the foregoing and also envisages constructs of which the following gives examples.

EXAMPLE 1

This example illustrates the preparation of a cheese product similar in characteristic to Colby cheese.

3500 kg of fresh whole milk was standardised to 3.5% fat and pasteurised (73° C. for 16 seconds). The standardised whole milk after heating to 50° C. was then concentrated by continuous ultrafiltration (Koch HFK 131 spiral wound membranes from Koch Membrane Systems, Wilmington, Mass., USA) using a concentration factor of approximately 4.2 kg feed/kg retentate. This gave a resultant UF retentate yield of 830 kg, with composition of 29.2% total solids.

The retentate was cooled to 4° C. and diluted with 4° C. water to give a retentate refractive index of 12° Brix, and the pH reduced to 5.8 by the careful addition and mixing of 3% w/w lactic acid.

This acidified retentate was then heated to 50° C. and diafiltered. Water was continuously added to maintain the refractive index at 12° Brix, and the pH of the retentate was modified by addition of 3% w/w lactic acid to maintain a pH of no more than 5.9. Diafiltration was continued until 35% of the total calcium in the milk had been removed.

After diafiltration, 425 liters of this retentate were adjusted to a pH of 6.4 using 5% w/w NaOH, then batch concentrated by ultrafiltration at 50° C. (Koch HFK 131 membranes), to a final retentate of 33.1% total solids, 15.1% total protein, 12.7% milk fat, 1.1% total ash, and lactose of 1.1%.

A portion, 20 kg, of the retentate was cooled to 4° C. and held for later use, (Ingredient A). The remainder, 405 kg, was evaporated in a two-effect falling film evaporator at a maximum product temperature of 60° C., and then spray dried (Anhydro compact-style nozzle drier with integral fluid bed, APV Nordic Anhydro, Soborg-Copenhagen, Denmark) with inlet air temperature 180° C., main chamber exit air temperature 80° C., product feed pressure 110-140 bar, and integrated static fluid bed air temperature 75° C. The result was a whole milk protein concentrate powder (WMPC), (Ingredient B), 97.6% total solids, 45.1% total protein, 37.5% fat, 3;13% total ash, 3.31% lactose, and reduction of the calcium to protein ratio of 41% as compared to the original milk.

Fresh cream was pasteurized and separated to a high fat content, of 75% milk fat and held at 50° C. until use (Ingredient C).

A twin screw lay-down cooker (Blentech CC45, Blentech Corporation, Rohnert Park, Calif. 94927, USA) was pre-warmed to 40° C. then 3.4 kg of Ingredient A, at 4° C., 2.1 kg of Ingredient C, at 50° C., 0.17 kg salt (NaCl), and 2.1 kg warm water (70° C.) were added then mixed over a period of one minute. Screw speed was 45 rpm.

5.0 kg of Ingredient B, was then added over the next minute, to give a total mass of 12.77 kg whilst maintaining the temperature at approximately 45 to 50° C. by indirect heating.

Mixing continued for a further 19 minutes. Screw speed was unchanged at 45 rpm. At this point, the mixed material was a homogeneous emulsion.

The operating speed was then increased to 120 rpm and the temperature slowly raised from 45° C. to 70° C. over four minutes by the direct injection of culinary steam. During this stage of processing, heating and agitation, the emulsion started to coagulate and became cohesive.

Hot coagulum was discharged at slow agitator speed through the end gate of the lay-down cooker into a plastic bag, sealed and formed into a flat sheet of around 20 mm thickness on a chilled stainless steel surface, ('cold table', surface temperature approximately 2° C.) and cooled for 60 minutes. This bagged product was frequently turned on the cold table and was then stored at cool-room conditions, 5° C.

The resultant final product had the form of a gelled, cheese-like product of the following approximate composition: 60% total solids, 21% total protein, 36% fat, 60% fat in dry matter, 1.6% salt (NaCl), and a pH of 6.2.

Visual observation and texture tests demonstrated that the product had colour and texture characteristics similar to that of Colby cheese.

EXAMPLE 2

This example illustrates a method for the preparation of a cheese product similar in characteristic to a cheddar cheese.

Fresh whole milk was separated to give 3300 liters of skim milk of 0.08% fat. The skim milk was pasteurised (73.5° C. for 16 seconds) and cooled to 4° C. The cream removed during separation was pasteurised, cooled to 4° C. and held aside for blending back at a later stage.

The pH of the skim milk was reduced to 5.9 by the careful addition and mixing of 3% w/w lactic acid, and held for 105 minutes. The slim milk was then concentrated by continuous ultrafiltration (Koch HFK 131 membranes) at a temperature of 15° C., using a concentration factor of approximately 5.2 kg feed/kg retentate. Continuous diafiltration water was added into the plant at a ratio of about 1 part of water per 16 parts of skim milk. This gave a resultant UF retentate yield of 630 liters, with a composition of 20% total solids, 15.8% milk protein, and removal of approximately 40% of the total calcium in the milk.

A portion of the retentate was cooled to 4° C. and held for later use (Ingredient A). The remainder was blended with cream of 40% fat level (from the original whole milk separation) at a required weight ratio to give a retentate/cream mix with fat in the dry matter of 25.3%. This blend was then spray dried (Anhydro compact-style nozzle drier with integral fluid bed) with inlet air temperature 180° C., main chamber exit air temperature 72° C., product feed pressure 90 bar, and integrated static fluid bed air temperature 75° C. The result was a skim milk protein concentrate powder (SMPC), (Ingredient B), 98% total solids, 57.3% protein, and reduction of the calcium to protein ratio of 36% as compared to the original skim milk.

Fresh high fat cream (Ingredient C) was produced as described in Example 1.

In addition, pasteurised skim milk was processed as follows: 1800 liters of skim milk was pasteurised, cooled to 8° C., and then calf rennet extract was added at a ratio of 1:18,000. The skim milk was held unagitated for approximately 14 hours. The pH was then reduced to 5.4 by the in-line injection of food grade acid, heated to 45° C. and held for five minutes, during which time a curd precipitate formed. The curd was separated from the whey by an inclined dewheying screen. The curd was then washed in acidified water of approximately 32° C. and pH 2.6, using a ratio of 0.5 liters of wash water for each liter of original skim milk. The curd/water mixture was then dewatered by pumping to a horizontal solid bowl decanter centrifuge (Sharples J83P-2000 CV, Penwalt Corporation, Warminister, Pa., USA), to give a curd with a moisture of approximately 53%. This curd was milled to achieve a particle size reduction by processing through an 'Urschel Comitrol' mill. The milled curd was then dried in a ring-drier (Barr and Murphy, Barr-Rosin Ltd, Maidenhead, Berkshire, UK) with an inlet air temperature of 180° C. and exit air temperature of 70° C. The dried curd was sifted through a 180 μm aperture screen to remove oversize material. This sifted curd product (Ingredient D) had a composition of 6.8% moisture; 0.5% fat, 87.4% protein, 1.2% lactose, a calcium level of 400 mmol kg, and a pH of 6.0.

A twin screw lay-down cooker (Blentech CC45), was pre-warmed to 40° C., then 4.5 kg of Ingredient C, at 50° C., 3.8 kg of Ingredient A at 4° C., 5.2 kg of Ingredient B, 0.25 kg of Ingredient D and 0.25 kg salt NaCl) were added then mixed over a period of two minutes while indirect heat was applied, to achieve a temperature of 50° C. Screw speed was 120 rpm.

0.45 kg of a natural dairy flavour (Maverik JLS 2040, Maverik Flavors and Ingredients, LLC, Saukville, Wis., USA) and 0.02 kg of 80% w/w lactic acid were then added. Mixing continued for a further 14 minutes with the screw speed unchanged at 120 rpm. At this point, the mixed material was a homogeneous emulsion.

The temperature was raised from 50° C. to 70° C. over two minutes by the direct injection of culinary steam. During this stage of processing, heating and agitation, the emulsion started to coagulate and became cohesive.

Samples of the hot coagulum were packed into 500-gram tubs and then stored at cool-room conditions, 5° C. overnight.

The resultant final product had the form of a gelled, cheese-like product of the following composition: 68.0% total solids, 26.4% total protein, 32.0% fat, 3.8% total ash, 1.9% salt (NaCl), 5.8% lactose, and a pH of 5.49.

Visual observation and texture tests demonstrated that the product had colour and texture characteristics similar to that of Cheddar cheese.

EXAMPLE 3

This example illustrates a method for the preparation of a cheese product, similar in characteristic to Colby cheese.

Fresh whole milk was separated to give 9800 liters of skim milk of 0.08% fat. The skim milk was pasteurised (73.5° C. for 16 seconds) and cooled to 6° C. The cream removed during separation was pasteurised, cooled to 4° C. and held aside for blending back at a later stage.

The pH of the skim milk was reduced to 5.9 by the careful addition and mixing of 3% w/w lactic acid, and held for 80 minutes. The skim milk was then concentrated by continuous ultrafiltration (Koch HFK 131 membranes) at a temperature of 15° C., using a concentration factor of approximately 4.5 kg feed/kg retentate. Continuous diafiltration water was added into the plant at a ratio of about 1 part of water per 42 parts of skim milk. This gave a resultant UF retentate yield of 2170 liters, with a composition of 18.7% total solids, 14.5% milk protein, and removal of approximately 42% of the total calcium in the milk.

Retentate was blended with cream of 40% fat level (from the original whole milk separation) at a required weight ratio to give a retentate/cream mix with fat in the dry matter of 38%. This blend was then evaporated in a Wiegand two-effect falling film evaporator (GEA Wiegand, GmbH, Einsteinstraβe 9-15, 76275 Ettlingen, Germany), with a maximum product temperature of 57° C. This gave a resultant concentrate of 43% total solids.

This concentrate was then ether evaporated in an Artisan agitated thin film evaporator (Artisan Industries Inc, Waltham, Mass., USA) at a product temperature of 43° C., to give a paste with total solids level of 48.5% (Ingredient A).

In addition, fresh whole milk was separated to give 7540 liters of skim milk of 0.08% fat. The skim milk was pasteurised (73.5° C. for 16 seconds) and cooled to 4° C. The cream removed during separation was pasteurised, cooled to 4° C. and held aside for blending back at a later stage.

The pH of the skim milk was reduced to 5.9 by the careful addition and mixing of 3% w/w lactic acid, and held for 90 minutes. The skim milk was then concentrated by continuous ultrafiltration (Koch HFK 131 membranes) at a temperature of 15° C., using a concentration factor of approximately 5.0 kg feed/kg retentate. Continuous diafiltration water was added into the plant at a ratio of about 1 part of water per 46 parts of skim milk. This gave a resultant UF retentate yield of 1500 liters, with a composition of 18.7% total solids, 14.2% milk protein, and removal of approximately 45% of the total calcium in the milk.

The retentate was blended with cream of 40% fat level (from the original whole milk separation) at a required weight ratio to give a retentate/cream mix with fat in the dry matter of 39.6%. This blend was then evaporated in a Wiegand two-effect falling film evaporator, with a maximum product temperature of 57° C. This gave a resultant concentrate of 43% total solids.

This concentrate was then spray dried (Anhydro compact-style nozzle drier with integral fluid bed) with inlet air temperature 185° C., main chamber exit air temperature 68° C., product feed pressure 95 to 110 bar, and integrated static fluid bed air temperature 70° C. The result was a skim milk protein concentrate powder (SMPC), (Ingredient B), 95.3% total solids, 43.4% protein, 39.6% fat in dry matter, and reduction of the calcium to protein ratio of 47% as compared to the original skim milk.

A further ingredient was prepared by the same process as used to prepare Ingredient D in Example 2. This curd product (ingredient D) had a composition of 5.2% moisture, 0.4% fat, 88.4% protein, 1.4% lactose, a calcium level of 425 mmol/kg, and a pH of 5.9.

A twin screw lay-down cooker (Blentech CC45), was pre-warmed to 40° C. then 10.45 kg of Ingredient A was added, and indirectly heated to a temperature of 47° C. while being stirred for five minutes. Screw speed was 130 rpm. Screw speed was increased to 160 rpm and 3.15 kg of Ingredient B, 0.25 kg of Ingredient D, 0.25 kg of salt (NaCl), and 0.05 kg of citric acid powder were added over a period of one minute. Mixing continued for a further six minutes at a screw speed of 160 rpm. At this point, the mixed material was a homogeneous emulsion.

The operating speed was then decreased to 80 rpm. The temperature was raised from 50° C. to 70° C. over two minutes by the direct injection of culinary steam. During this stage of processing, heating and agitation, the emulsion started to coagulate and became cohesive.

Samples of the hot coagulum were packed into 500-gram tubs and then stored at cool-room conditions, 5° C. overnight.

The resultant final product had the form of a gelled, cheese-like product of the following composition: 60.5% total solids, 27.3% total protein, 23.2% fat, 3.8% total ash, 1.9% salt (NaCl), 6.2% lactose, a calcium level of 5140 mg/kg, and a pH of 5.53.

Visual observation and texture tests demonstrated that the product had texture characteristics similar to that of Colby cheese.

EXAMPLE 4

This example illustrates a method for the preparation of a cheese product, similar in characteristic to Edam cheese.

A skim milk UF retentate was prepared as in the preparation of Ingredient A of Example 3. This retentate was blended with cream of 40% fat level as in Example 3, but at a required weight ratio to give a retentate/cream mix with fat in the dry matter of 41%. This blend was then evaporated in a Wiegand two-effect falling film evaporator, with a maximum product temperature of 57° C. This gave a resultant concentrate of 40.5% total solids.

This concentrate was then further evaporated in an Artisan agitated thin film evaporator at a product temperature of 39° C., to give a paste with total solids level of 46.1% (Ingredient A).

Fresh high fat cream (Ingredient C) was produced as described in Example 1.

A twin screw lay-down cooker (Blentech CC45), was pre-warmed to 40° C., then 8.1 kg of Ingredient A, 2.45 kg of Ingredient C, 3.1 kg of Ingredient B as described in Example 3, 0.25 kg of Ingredient D as described in Example 3, 0.245 kg of salt (NaCl), and 0.03 kg of 80% w/w lactic acid were added over a period of two minutes. Screw speed was 50 rpm. Mixing continued for a further 9 minutes at this screw speed. The screw speed was then increased to 160 rpm and mixing continued for a further eight minutes. 0.75 kg of a natural dairy flavour (Maverik JLS 2131, Maverik Flavors and Ingredients, LLC, Saukville, Wis., USA) was then added and stirred in over one minute while screw speed was maintained at 160 rpm. At this point, the mixed material was a homogeneous emulsion.

The operating speed was then decreased to 80 rpm The temperature was raised from 45° C. to 70° C. over three minutes by the direct injection of culinary steam. During this stage of processing, heating and agitation, the emulsion started to coagulate and became cohesive.

Samples of the hot coagulum were packed into 500-gram tubs and then stored at cool-room conditions, 5° C. overnight.

The resultant final product had the form of a gelled, cheese-like product of the following composition: 62.3% total solids, 23.1% total protein, 30.9% fat, 3.4% total ash, 1.8% salt (NaCl), 4.9% lactose, a calcium level of 4290 mg/kg, and a pH of 5.51.

Visual observation and texture tests demonstrated that the product had texture characteristics similar to that of Edam cheese.

EXAMPLE 5

This example illustrates a method for the preparation of a cheese product, with a semi-hard cheese texture.

Fresh whole milk was pasteurised (73° C. for 16 seconds), separated and then fat standardised to produce 3480 liters of milk of 3.8% protein, 4.75% milk fat, and 12% total solids.

The whole milk was cooled to 5° C. and then the pH of the milk was reduced to 5.95 by the careful addition and mixing of 3% w/w lactic acid, and held for 90 minutes. The milk was then concentrated by continuous ultrafiltration (Koch HFK 131 membranes) at a temperature of 45° C., using a concentration factor of approximately 4.2 kg feed/kg retentate. Continuous diafiltration water was added into the plant at a ratio of about 1 part of water per 9 parts of whole milk. This gave a resultant UF retentate yield of 825 liters, with a composition of 31.7% total solids, 12.2% milk protein, and removal of approximately 40% of the total calcium in the milk.

The whole milk retentate was evaporated in a Wiegand two-effect falling film evaporator, with a maximum product temperature of 57° C., producing a concentrate of approximately 45% total solids.

This concentrate was then further evaporated in an Artisan agitated thin film evaporator at a product temperature of 36° C., to give a paste with total solids level of 55.7% (Ingredient A).

Fresh high fat cream (Ingredient C) was produced as described in Example 1.

A further ingredient was prepared by the same process as used to prepare Ingredient D in Example 2. This curd product (Ingredient D) had a composition of 8.3% moisture, 0.6% fat, 87.9% protein, 1.1%4 lactose, a calcium level of 216 mmol kg, and a pH of 5.5.

A twin screw lay-down cooker (Blentech CC45), was pre-warmed to 40° C., then 8.37 kg of Ingredient A, 2.07 kg of Ingredient C, and 1.95 kg of a high-fat Milk Protein Concentrate powder (ALAPRO Spec 4454, NZMP, New Zealand) were added over a period of two minutes. Screw speed was 50 rpm. Screw speed was then increased to 160 rpm. After one minute, 0.225 kg of Ingredient D, 0.23 kg of salt (NaCl), and 0.05 kg of 80% w/w lactic acid were added over a further period of one minute. Mixing continued for a further nine minutes at a screw speed of 160 rpm. At this point, the mixed material was a homogeneous emulsion.

The operating speed was then decreased to 80 rpm. The temperature was raised from 27° C. to 70° C. over four minutes by the direct injection of culinary steam. During this stage of processing, heating and agitation, the emulsion started to coagulate and became cohesive.

Samples of the hot coagulum were packed into 500-gram tubs and then stored at cool-room conditions, 5° C. overnight.

The resultant final product had the form of a gelled, cheese-like product of the following composition: 62.5% total solids, 20.3% total protein, 32.3% fat, 3.5% total ash, 1.9% salt (NaCl), 6.4% lactose, a calcium level of 4360 mg/kg, and a pH of 5.60.

Visual observation and texture tests demonstrated that the product had texture characteristics similar to that of a soft Colby cheese.

EXAMPLE 6

This example illustrates a method for the preparation of a cheese product similar in characteristic to Cheddar cheese.

The following ingredients were added into a mixer bowl similar to a 'Hobart' type (Hobart Corporation, Troy, Ohio 45374, USA) as follows: 9.2 kg of cream (40% fat) was preheated in a stainless steel container by indirect hot water, and was then added into the mixer bowl and stirred at 40 rpm for one minute while heated to 55° C. Insulated electrical heat trace provided an indirect heating source on the mixer bowl. 8.8 kg of Ingredient B as described in Example 3 was added and mixed in the bowl for eight minutes. Then 0.5 kg of Ingredient D as described in Example 2, and 0.28 kg of salt (NaCl) were added over one minute. After another two minutes of mixing at 40 rpm, 0.05 kg of 80% w/w lactic acid was added. The mixing speed was increased to 60 rpm and mixing continued for a further thirteen minutes. Some of this material was then extracted from the bowl. After a holding time of 90 minutes, 0.675 kg of warm water was added to the remaining 11.6 kg of this mixture to give a mix at 33° C. At this point, the mixed material was a homogeneous emulsion.

This mixture was then transferred to a feed hopper attached to a Miltenz 51-SP single-screw extruder (Millbank Technology (NZ) Ltd, Panmure, Auckland, New Zealand). The product passed through a steam-jacketed extruder barrel (inner diameter 48 mm and screw outer diameter of 45 mm) at a screw speed of 236 rpm, with a product inlet temperature of 43° C., a product outlet temperature of 83° C. and a die outlet of 6 mm diameter. During this stage of processing, heating and agitation, the emulsion started to coagulate and became cohesive.

Samples of the hot coagulum were packed into 500-gram tubs and then stored at cool-room conditions, 5° C. overnight.

The resultant final product had the form of a gelled, cheese-like product of the following composition: 70.7% total solids, 23.7% total protein, 38.3% fat, 3.3% total ash, 1.6% salt (NaCl), 5.4% lactose, and a pH of 5.52.

Visual observation and texture tests demonstrated that the product had texture characteristics similar to that of Cheddar cheese.

EXAMPLE 7

This example illustrates a method for the preparation of a cheese product similar in characteristic to Edam cheese.

A twin-screw lay-down cooker (Blentech CC45) was prewarmed to 40° C. Then 6.8 kg of cream (40% fat) was added and indirectly heated from 10° C. to 41° C. over a one-minute period. Screw speed during this heating was 48 rpm. 6.8 kg of Ingredient B as described in Example 3, 0.87 kg of warm water, 0.19 kg of salt, and 0.25 kg of Ingredient D as described in Example 2, were added over the next two minutes, followed by 0.05 kg of 80% w/w lactic acid a minute later. Screw speed continued at 48 rpm during these additions and for a further two minutes. At this point, the mixed material was a homogeneous emulsion.

The operating speed was then increased to 80 rpm. The temperature was raised from 41° C. to 50° C. over two minutes by the indirect heating. The emulsion was packed into a large plastic bag, and held in a warm insulated bin until further use.

The process was continued when the emulsion was transferred to a manual sausage filler. This filler was used to feed the emulsion through a microwave applicator at a rate of 6.5 kg/hr. The microwave applicator consisted of a short length of 100 mm×50 mm rectangular waveguide with a 30 mm plastic product pipe spanning the 100 mm dimension. The emulsion was heated in the microwave section from an inlet temperature of 50° C. to an outlet temperature of 100° C. The heated product was then passed through a twin-screw extruder (Clextral BC21, Clextral SA, 42702 Firminy Cedex, France) operating at a screw speed of around 450 rpm, and a die outlet temperature of around 100° C. During these stages of microwave heating and extruder processing, the emulsion started to coagulate and became cohesive.

Samples of the hot coagulum were packed into 500-gram tubs and then stored at cool-room conditions, 5° C. overnight.

The resultant final product had the form of a gelled, cheese-like product of the following composition: 66.7% total solids, 21.7% total protein, 36.3% fat, 3.0% total ash, 1.4% salt (NaCl), and 5.7% lactose, and a pH of 5.56.

Visual observation and texture tests demonstrated that the product had texture characteristics similar to that of Edam cheese.

EXAMPLE 8

This example illustrates a method for the preparation of a cheese product, similar in characteristic to Colby cheese.

Fresh high fat cream (Ingredient C) was produced as described in Example 1.

A twin screw lay-down cooker (Blentech CC45), was prewarmed to 40° C., then 6.5 kg of Ingredient B as described in Example 3, 3.4 kg of Ingredient C, 0.24 kg of salt (NaCl), 0.25 kg of Ingredient D as described in Example 2, 0.75 kg of a natural dairy flavour (Maverik JLS 2131, Maverik Flavors and Ingredients, LLC, Saukville, Wis., USA), and 2.9 kg of warm water (70° C.) were added over a period of two minutes. Screw speed was 50 rpm. Mixing continued for a further two minutes at this screw speed. The speed was then increased to 160 rpm and mixing continued for a further ten minutes. At this point, the mixed material was a homogeneous emulsion.

The screw speed was then decreased to 80 rpm and direct steam injection was commenced so that the combined mass heated from approx 45° C. to 70° C. over two minutes. During this stage of processing, heating and agitation, the emulsion started to coagulate and became cohesive.

Samples of the hot coagulum were packed into 500-gram tubs and then stored at cool-room conditions, 5° C. overnight.

The resultant final product had the form of a gelled, cheese-like product of the following composition: 0.67.6% total solids, 22.4% total protein, 36.6% fat, 3.5% total ash, 1.9% salt NaCl), and 5.1% lactose, and a pH of 5.36.

In a sensory evaluation a week later, the sample was described as a clean, creamy full-flavoured product, similar to mild Cheddar. Texture tests demonstrated that the product had texture characteristics similar to that of Colby cheese.

EXAMPLE 9

This example illustrates a method for the preparation of a cheese product similar in characteristic to a Cheddar cheese.

A skim milk UF concentrate was prepared by ultrafiltration and falling film evaporation as in the preparation of Ingredient A of Example 3. This concentrate was then spray dried (Anhydro compact-style nozzle drier with integral fluid bed) with inlet air temperature 185° C., main chamber exit air temperature 70° C., product feed pressure 125 bar, and integrated static fluid bed air temperature 71° C. The result was a milk protein concentrate powder (MPC), (Ingredient B), 98.5% total solids, 44.2% protein, 41.4% fat, 3.5% total ash, 11.6% lactose, and reduction of the calcium to protein ratio of 56% as compared to the original skim milk.

Fresh high fat cream (Ingredient C) was produced as described in Example 1.

A twin screw lay-down cooker (Blentech CC45), was prewarmed to 40° C., then 2.8 kg of Ingredient C, 3.68 kg of warm water and 7.28 kg of Ingredient B were added and then indirectly heated over two minutes to give a mixture temperature of 49° C. Screw speed was 50 rpm over this addition and heating time. 0.255 kg of salt (NaCl) and 0.06 kg of 80% w/w lactic acid were then added over the next minute while screw speed remained at 50 rpm. The screw speed was then increased to 160 rpm and mixing continued for eight minutes. 0.04 kg of pure locust bean gum (Grinsted LBG 066, Danisco Ingredients, Brabrand, Denmark) was then added, and mixing continued at a screw speed of 160 rpm for a further two minutes. At this point, the mixed material was a homogeneous emulsion.

The screw speed was then decreased to 80 rpm and direct steam injection was commenced so that the combined mass heated from 50° C. to 70° C. over two minutes. During this stage of processing, heating and agitation, the emulsion started to coagulate and became cohesive.

Samples of the hot coagulum were packed into 500-gram tubs, stored at cool-room conditions, 5° C. overnight, and then vacuum packed.

The resultant final product had the form of a gelled, cheese-like product of the following composition: 67.6% total solids, 22.3% total protein, 36.0% fat, 3.6% total ash, 2.0% salt (NaCl), and 6.3% lactose, and a pH of 5.61.

Visual observation and texture tests demonstrated that the product had texture characteristics similar to that of a Cheddar cheese but with a more elastic, fibrous structure.

EXAMPLE 10

This example illustrates a method for the preparation of a cheese-like product, with a semi-hard cheese texture.

A deodorised, partially hydrogenated soya bean oil (HSBO) of specified solid fat content profile (10° C.: 58-65%; 20° C.: 38-34%; 30° C.: 5-9%) and iodine value (75-81) (supplied by Bakels Edible Oils Ltd, Mt Maunganui, New Zealand) was melted.

A twin screw lay-down cooker (Blentech CC45), was prewarmed to 40° C., then 4.53 kg of warm water, 2.45 kg of the melted HSBO, and 6.6 kg of Ingredient B as used in Example 9, were added and indirectly heated over one minute to give a mixture temperature of 45° C. Screw speed was 50 rpm over this addition and heating, time. 0.255 kg of salt (NaCl), 0.25 kg of Ingredient D as described in Example 3, and 0.06 kg of 80% w/w lactic acid were then added over the next minute while screw speed remained at 50 rpm. The screw speed was then increased to 160 rpm for a period of five minutes, and then to 200 rpm for nine minutes. At this point, the mixed material was a homogeneous emulsion.

The screw speed was then decreased to 80 rpm and direct steam injection was commenced so that the combined mass heated from 45° C. to 72° C. over two minutes. During this stage of processing, heating and agitation, the emulsion started to coagulate and became cohesive.

Samples of the hot coagulum were packed into 500-gram tubs, stored at cool-room conditions, 5° C. overnight, and then vacuum packed.

The resultant final product had the form of a gelled, cheese-like product of the following composition: 65.4% total solids, 21.3% total protein, 35.9% fat, 3.4% total ash, 1.9% salt NaCl), 4.8% lactose, a calcium level of 4060 mg/kg, and a pH of 5.59.

Visual observation and texture tests demonstrated that the product had smooth texture characteristics similar to that of a soft Colby cheese.

EXAMPLE 11

This example illustrates a method for the preparation of a cheese-like product, with a semi-hard cheese texture.

A twin screw lay-down cooker (Blentech CC10), was prewarmed to 40° C., then 1.7 kg of warm water (70° C.) and 1.75 kg of melted anhydrous milkfat (AMF) were added and mixed over a period of three minutes. The mix temperature was 52° C. Screw speed was 80 rpm. A dry, pre-mixed combination of 0.75 kg of SUPRO EX33 Soy Protein Isolate (Protein Technologies International, Pryor, Okla., USA) and 0.75 kg of Instant Skim milk powder (Spec 6820, NZMP, Wellington New Zealand) was then added and mixed in over a period of one minute. Screw speed was then increased to 160 rpm. 0.24 kg of salt (NaCl) and 0.05 kg of 80% w/w lactic acid were then added and mixing of this material continued for a further 15 minutes. At this point, the mixed material was a homogeneous emulsion.

The operating speed was then decreased to 80 rpm and after one minute, the temperature was raised from 48° C. to 71° C. over two minutes by the direct injection of culinary steam. During this stage of processing, heating and agitation, the emulsion started to coagulate and became cohesive.

Samples of the hot coagulum were packed into 500-gram tubs and then stored at cool-room conditions, 5° C. overnight, and were then vacuum packed.

The resultant final product had the form of a gelled, cheese-like product of the following composition: 63.5% total solids, 18.1% total protein, 34.1% fat, 3.3% total ash, 1.9% salt (NaCl), 8.0% lactose, a calcium level of 1830 mg/kg, and a pH of 5.38.

Visual observation and texture tests demonstrated that the product had texture characteristics similar to that of a soft Cheddar cheese.

EXAMPLE 12

This example illustrates a method for the preparation of a cheese spread-like product.

A skim milk UF concentrate was prepared by ultrafiltration and failing film evaporation as in the preparation of Ingredient A of Example 3.

This concentrate was then further evaporated in an Artisan agitated thin film evaporator at a product temperature of 43° C., to give a paste with total solids of 45.5% (Ingredient A).

Ingredients were added into a Stephan upright cooker (model UMM ISK 25 GNI, A. Stephan und Söhne GmbH & Co., Hameln, Germany) (nominal batch capacity 25 kg) as follows: 10.0 kg of Ingredient A and 0.1 kg of salt (NaCl) were added and mixed for six minutes at a scraper stirrer speed of 60 rpm and knife speed of 1500 rpm. Indirect heating was used during this time to increase the temperature from 28° C. to 42° C.

The knife speed was then increased to 3000 rpm and direct steam injection was commenced, so that the mixture temperature increased from 42° C. to 73° C. over three minutes. During this stage of processing, heating and agitation, the emulsion started to coagulate and became cohesive.

Samples of the hot coagulum were packed into 500-gram tubs and then stored at cool-room conditions, 5° C. overnight, and then vacuum packed The resultant final product had the following composition: 42.3% total solids, 17.2% total protein, 17.0% fat, 1.4% total ash, 1.1% salt (NaCl), 6.7% lactose, and a calcium level of 3140 mg/kg.

Visual observation demonstrated that the product had texture characteristics similar to that of a cheese spread.

EXAMPLE 13

This example illustrates a method for the preparation an aerated, mousse-like product.

Ingredients were added into a Stephan upright cooker (Model UMM ISK 25 GNI) as follows: 0.7 kg of Ingredient B as described in Example 9, 16.8 kg of fresh 42% fat cream (4° C.) and 0.34 kg of salt (NaCl) were added and mixed for five minutes at a scraper speed of 60 rpm. Indirect heating was used during this time to increase the temperature from 18° C. to 48° C. 0.33 kg of Ingredient D as described in Example 5 was then added and mixing continued for three minutes at a scraper speed of 60 rpm and a knife speed of 3000 rpm. 0.08 kg of 80% w/w lactic acid was then added. Mixing continued for a further two minutes at a scraper speed of 60 rpm and a knife speed of 3000 rpm, then a five kilogram sub sample was taken and set aside for comparison with the finished product. Mixing of the remaining mixture was then continued for another nine minutes at a scraper speed of 60 rpm and a knife speed of 3000 rpm, and another sub sample was then taken.

After a further four minutes of mixing at the above conditions, direct steam injection was then commenced, so that the mixture temperature increased from 48° C. to 70° C. over two minutes. Mixing continued during this time at a scraper speed of 60 rpm and a knife speed of 3000 rpm.

Samples of the hot, mousse-like coagulum and of the five-kilogram sub sample were packed into 500-gram tubs and then stored at cool-room conditions, 5° C. overnight, and then vacuum packed.

The resultant final product had the following composition: 48.8% total solids, 4.8% total protein, 38.9% fat, 2.3% total ash, 1.8% salt (NaCl), 2.8% lactose, a calcium level of 920 mg/kg, and a final pH of 5.11.

The resultant product was described as a soft, but structured, smooth, aerated gel, which did not pour. In contrast, the cooled sub sample that had not been heated to 70° C. was a still flowable liquid.

EXAMPLE 14

This example illustrates a method for the preparation of a yoghurt-like product.

0.7 kg of Ingredient B as described in Example 9, 3.0 kg of Instant Skim milk powder (Spec 6820, NZMP), and 0.1 kg of pure locust bean gum (Grinsted LBG 066) were mixed in a dry container to create a powder premix.

Ingredients were then added into a Stephan upright cooker (Model UMM ISK 25 GNI) as follows: 8.75 kg of warm water (70° C.) and then the powder premix were added. A ten-second period of mixing at a scraper stirrer speed of 60 rpm and a knife speed of 1500 rpm was followed by five minutes of mixing at a scraper speed of 60 rpm. Indirect heating was then used to heat the mixture from 48° C. to 80° C. over a two-minute period while mixing at a scraper speed of 60 rpm and a knife speed of 1500 rpm. The mixture then held at 80° C. for a further two minutes while stirring continued at scraper speed of 60 rpm. Indirect cooling was then applied, to lower the mixture temperature to 35° C. over a fifteen-minute period. A blend of 0.96 kg of 20% w/w lactic acid and 0.24 kg of 20% w/w acetic acid was added very slowly to the mixture as three separate part doses, while nixing was stopped. Five seconds of mixing at a scraper speed of 60 rpm was allowed after the addition of each part dose to stir the acid in. This was followed by a final 10 minutes of mixing at a scraper speed of 60 rpm.

The warm, yoghurt-like mass was poured into 250-gram, clear, plastic screw-top containers and cooled overnight at cool-room conditions of 5° C.

The resultant final product had the following composition: 24.1% total solids, 8.6% total protein, 1.1% fat, 1.7% total ash, 0.3% salt (NaCl), 12.7% lactose, a calcium level of 2900 mg/kg, and a final pH of 4.4.

The resultant product texture was described as a smooth, creamy, slightly aerated, yoghurt-like gel, similar to fromage frais.

EXAMPLE 15

This example illustrates a method for the preparation of a cheese product, similar in characteristic to Colby cheese.

79.2 kg of Ingredient B as described in example 9 was reconstituted into 180.8 kg water of 50° C. in a high shear mixing vessel. Agitation was continued for one hour after powder addition. This gave a resultant concentrate of 30% total solids.

This concentrate was then further evaporated in an Artisan agitated thin film evaporator at a product temperature of up to 60° C., to give a paste with a refractive index of around 54° Brix (Ingredient A).

Fresh high fat cream (Ingredient C) was produced as described in Example 1.

2.8 kg of Ingredient A, 0.2 kg of Ingredient C, 0.046 kg of salt (NaCl), and 0.015 kg of 80% w/w lactic acid were added over a period of four minute into a twin screw lay-down cooker (Blentech CC10). Screw speed was 55 rpm. This mix was indirectly steam heated from 19 to 49° C. over a period of 5 minutes. At this point, the mixed material was a homogeneous emulsion.

After holding for another 2 minutes at 49° C. and mixing at 55 rpm, the temperature was raised from 49° C. to 70° C. over ten minutes by indirect steam heating. During this stage of processing, heating and agitation, the emulsion started to coagulate and became cohesive.

Samples of the hot coagulum were packed into 500-gram tubs and then stored at cool-room conditions, 5° C. overnight.

The resultant final product had the form of a gelled, cheese-like product of the following composition: 63.7% total solids, 24.5% total protein (calculated), 28.8% fat (calculated), total ash 4.0% (calculated), 2.0% salt (NaCl) (calculated), 6.5% lactose (calculated), a calcium level of 3560 mg/kg (calculated), and a pH of 5.41.

Visual observation and texture tests demonstrated that the product had texture characteristics similar to that of Colby cheese.

INDUSTRIAL APPLICATION

Particularly, although by no means exclusively, the invention relates to a process for making a cheese product wherein there are greatly reduced residual active enzymes or microorganisms, and no emulsifying salts or non dairy based emulsifying agents in the finished product. This process is particularly advantageous over prior art processes as it can produce consistent cheese products having similar organoleptic properties to traditionally made cheeses but which are produced much more quickly, as such cheese products require no maturation time. In addition, as the rate of spoilage due to enzymatic or microbial action is significantly reduced, these products have an increased shelf life as compared to traditionally made cheeses. They are also considerably less material, labour and cost intensive and more cost effective to produce where the production, packaging and storage process may be largely automated and simplified.

It will be appreciated that it is not intended to limit the invention to the above examples only, many variations, such as might readily occur to a person skilled in the art being possible without departing from the scope of the appended claims.

The invention claimed is:

1. A process for making a fat-containing stable cheese product comprising the steps:
   (i) providing a first milk protein based composition;
   (ii) combining the product from step (i) with at least one additive, other than an emulsifying salt or non dairy derived emulsifying agents, selected from the group consisting of a flavour enhancer, a texture enhancer, a nutritional supplement, a fat source, a carbohydrate source, condiments, a second milk protein based composition, a non-dairy protein source, and any other dairy derived product or GRAS ingredient, and agitating to create a stable emulsion;
   (iii) heating the emulsion of step (ii) to a temperature above 50° C. for up to 60 minutes, to initiate coagulation and gel formation; and
   (iv) cooling the product of step (iii) to complete gel formation and to produce a final cheese product;
   wherein the first milk protein based composition is modified to alter one or more properties selected from flavour, texture, nutritional composition and functionality of the final cheese product; and
   wherein said first milk protein based composition comprises a milk or milk product selected from the group consisting of pasteurized or unpasteurized whole milk, skim milk, reduced fat milk, fat enhanced milk, milk ultrafiltration retentates, milk concentrates, powdered whole, reduced fat or skim milk, reconstituted whole, reduced fat or skim milk powder or any combination thereof, wherein said milk or milk product is sourced from any milk producing animal or analogue milk; with the proviso that when the first milk protein based composition of step (i) is a milk ultrafiltration retentate, the second milk protein based composition or non-dairy protein source added in step (ii) is not a protein concentrate or isolate; with the proviso that a bacterial starter culture is not used to make the cheese product.

2. A process as claimed in claim 1, further comprising the step of:
   (v) packing the final cheese product into a suitable package.

3. A process as claimed in claim 1, wherein said first milk protein based composition is modified by one or more of the group consisting of pH adjustment, mineral level adjustment, protein level adjustment, fat level adjustment, lactose level adjustment, moisture level adjustment, NaCl/KCl or enzyme addition, temperature treatment and shearing processes.

4. A process as claimed in claim 3, wherein said at least one modification increases the hydrophobicity of said milk protein.

5. A process as claimed in claim 4 wherein the cheese product, comprises both a first and second milk protein based composition.

6. A process as claimed in claim 1, wherein said first milk protein based composition is dehydrated to give increased total solids to less than 75%.

7. A process as claimed in claim 1, wherein the fat content of the first milk protein based composition is adjusted to between 0.05 and 7 wt % and the protein content adjusted to between 2 and 6 wt %.

8. A process as claimed in claim 7, wherein the fat content is adjusted to between 0.05 and 5 wt % and the protein content adjusted to between 2.5 and 4 wt %.

9. A process as claimed in claim 1, wherein combining step (ii) is carried out in a device capable of mechanical shear sufficient to produce a stable emulsion on mixing without having to add emulsifying salts.

10. A process as claimed in claim 1, wherein the flavour enhancer is selected from the group consisting of NaCl, KCl, food grade acids including lactic acid, citric acid, acetic acid, lactone and the like, lactose, fat, and flavours including enzyme modified cheeses.

11. A process as claimed in claim 1, wherein the texture enhancer is selected from the group consisting of water, food grade acid, lactose, fats, gums, starches, carbohydrates, sources of monovalent and divalent cations such as $CaCl_2$, NaCl and KCl.

12. A process as claimed in claim 2, wherein pH modification is effected by addition of at least one acidulant.

13. A process as claimed in claim 12, wherein said acidulant is selected from a food grade acid and lactone.

14. A process as claimed in claim 1, wherein the nutritional supplement is selected from the group consisting of vitamins, minerals, and carbohydrates.

15. A process as claimed in claim 1, wherein the heating step (iii) is carried out in a suitable device by direct or indirect methods selected from the group consisting of steam injection, microwave energy, indirect steam or other heating fluids, indirect electrical heating, radio frequency, ohmic heating and the like, to a suitable temperature above 50° C.

16. A process as claimed in claim 15, wherein the heating step (iv) is carried out at a temperature of up to 120° C.

17. A process as claimed in claim 1, wherein heating step (iii) is carried out in the same device as the combining and emulsification step (ii), when heating takes place whilst the emulsion is being continuously agitated at a temperature range of between 50 to 120° C. for up to 60 minutes to initiate coagulation and gel formation.

18. A process as claimed in claim 1, wherein further agitation is carried out concurrently with heating step (iii).

19. A process as claimed in claim 1, wherein further agitating is carried out subsequent to heating step (iii).

20. A process as claimed in claim 17, wherein heating takes place at 60 to 90° C. for up to 60 minutes.

21. A process as claimed in claim 17, wherein heating takes place at 65 to 75° C. for up to 60 minutes.

22. A process as claimed in claim 17, wherein heating takes place at a temperature range of between 50 and 120° C. for up to 10 minutes.

23. A process as claimed in claim 17, wherein heating takes place at a temperature range of between 50 and 120° C. for up to 5 minutes.

24. A process as claimed in claim 1, wherein cooling step (iv) is carried out at a temperature of less than 20° C.

25. A process as claimed in claim 1, wherein one or more further process step are applied to produce a desired final cheese product.

26. A process as claimed in claim 25, wherein the coagulating and gelling mixture of step (ii) is aerated or whipped to produce an aerated or whipped mousse-like product.

27. The process of claim 1, further comprising forming the product of step (iii) into a suitable shape prior to cooling.

28. The process of claim 1, wherein during step (ii) the additive is a second milk protein based composition.

29. The process of claim 28, wherein at least one of the said first and second milk protein based compositions is modified by one or more of the group consisting of pH adjustment, mineral level adjustment, protein level adjustment, fat level adjustment, lactose level adjustment, moisture level adjustment, NaCl/KCl or enzyme addition, temperature treatment and shearing processes.

30. A process as claimed in claim 28, wherein the second milk protein based composition is selected from the group consisting of:
   (a) whole milk, reduced fat milk, skim milk or reconstituted whole milk, reduced fat milk or skim milk having 0.05 to 7% fat and 2 to 6% protein; and/or
   (b) a milk of group (a) which has been dehydrated to increase total solids to 15 to 98%; and/or
   (c) a milk of group (a) and/or group (b) which has been modified to produce a desired property in the final cheese product.

31. A process as claimed in claim 30, wherein the fat and protein content of the milk protein based composition of group (a) comprises 0.05 to 5 wt % fat and 2.5 to 4 wt % protein.

32. A process as claimed in claim 30, wherein the first and/or second milk protein based composition is modified either before or after said composition is dehydrated.

33. The process of claim 1, further comprising dehydrating the first milk protein based composition to increase the total solids to 15 to 99 wt % prior to step (ii).

34. A process for making a fat-containing stable cheese product comprising the steps:
   (i) providing a first milk protein based composition;
   (ii) combining the first milk protein based composition with at least one additive, other than an emulsifying salt or non dairy derived emulsifying agents, selected from the group consisting of: a flavour enhancer, a texture enhancer, a nutritional supplement, a fat source, a carbohydrate source, condiments, a second milk protein based composition, a non-dairy protein source, and any other dairy derived product or GRAS ingredient, and agitating to create a stable emulsion, wherein the additive is a second milk protein based composition;
   (iii) heating the emulsion of step (ii) to a temperature above 50° C. for up to 60 minutes, to initiate coagulation and gel formation; and
   (iv) cooling the product of step (iii) to complete gel formation and to produce a final cheese product;
   wherein the first and/or second milk protein based compositions are modified to alter one or more properties selected from flavour, texture, nutritional composition and functionality of the final cheese product; and
   wherein the first and/or second milk protein based compositions comprise a milk or milk product selected from the group consisting of pasteurized or unpasteurized whole milk, skim milk, reduced fat milk, fat enhanced milk, milk ultrafiltration retentates, milk concentrates, powdered whole, reduced fat or skim milk, reconstituted whole, reduced fat or skim milk powder or any combination thereof, wherein said milk or milk product is sourced from any milk producing animal or analogue milk; with the proviso that when the first milk protein based composition of step (i) is a milk ultrafiltration retentate, the second milk protein based composition or non-dairy protein source added in step (ii) is not a protein concentrate or isolate; with the proviso that a bacterial starter culture is not used to make the cheese product.

35. A process for making a fat-containing stable cheese product comprising the steps:
   (i) providing a first milk protein based composition;
   (ii) combining the product from step (i) with at least one additive, selected from the group consisting of a flavour enhancer, a texture enhancer, a nutritional supplement, a fat source, a carbohydrate source, condiments, a second milk protein based composition, a non-dairy protein source, and any other dairy derived product or GRAS ingredient, and agitating to create a stable emulsion;
   (iii) heating the emulsion of step (ii) to a temperature above 50° C. for up to 60 minutes, to initiate coagulation and gel formation; and
   (iv) cooling the product of step (iii) to complete gel formation and to produce a final cheese product;
   wherein the first milk protein based composition is modified to alter one or more properties selected from flavour, texture, nutritional composition and functionality of the final cheese product; and
   wherein said first milk protein based composition comprises a milk or milk product selected from the group consisting of pasteurized or unpasteurized whole milk, skim milk, reduced fat milk, fat enhanced milk, milk ultrafiltration retentates, milk concentrates, powdered whole, reduced fat or skim milk, reconstituted whole, reduced fat or skim milk powder or any combination thereof, wherein said milk or milk product is sourced from any milk producing animal or analogue milk; with the proviso that when the first milk protein based composition of step (i) is a milk ultrafiltration retentate, the second milk protein based composition or non-dairy protein source added in step (ii) is not a protein concentrate or isolate; with the proviso that a bacterial starter culture is not used to make the cheese product.

* * * * *

UNITED STATES PATENT AND TRADEMARK OFFICE
CERTIFICATE OF CORRECTION

| | | |
|---|---|---|
| PATENT NO. | : 7,582,323 B2 | Page 1 of 1 |
| APPLICATION NO. | : 10/474289 | |
| DATED | : September 1, 2009 | |
| INVENTOR(S) | : Aird et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1317 days.

Signed and Sealed this

Fourteenth Day of September, 2010

David J. Kappos
*Director of the United States Patent and Trademark Office*